United States Patent [19]
Duffy

[11] 4,198,998
[45] Apr. 22, 1980

[54] RETRACTABLE AWNING

[76] Inventor: Donald D. Duffy, 124 Seventh St., Seal Beach, Calif. 90740

[21] Appl. No.: 964,730

[22] Filed: Nov. 29, 1978

[51] Int. Cl.² ............................................. E04F 10/04
[52] U.S. Cl. ................................. 135/5 AT; 135/1 A; 135/7.1 A; 160/66
[58] Field of Search ................... 135/5 A, 5 AT, 1 A, 135/7.1 A, 3 A; 160/66

[56] References Cited
U.S. PATENT DOCUMENTS

| | | | |
|---|---|---|---|
| 3,364,973 | 1/1968 | Railson | 160/26 |
| 3,833,011 | 9/1974 | Duffy | 135/7.1 A |
| 3,918,510 | 11/1975 | Hayward | 135/5 AT |
| 3,923,074 | 12/1975 | McKee | 135/5 AT |
| 4,077,419 | 3/1978 | Lux | 135/5 AT |

*Primary Examiner*—Reinaldo P. Machado
*Attorney, Agent, or Firm*—George F. Bethel; Patience K. Bethel

[57] ABSTRACT

The following specification discloses a retractable awning for a vehicle. The awning has a portion which serves to form the outside cover thereof when it is stowed and has a plurality of main bracing arms that are angularly secured to the side of the vehicle by brackets attached thereto and a pair of stabilizer arms which stabilize the awning in an extended position when held by the angular bracing members. Both the bracing arms and the stabilizer arms fold into a lead bar which can be wrapped within the awning proper and attached to the side of the vehicle whereby a portion of the awning forms a cover therefor. A pair of fairings or nacelles are secured to the ends of the awning when it is in its stowed condition in order to maintain the awning in a smooth, streamlined configuration.

13 Claims, 15 Drawing Figures

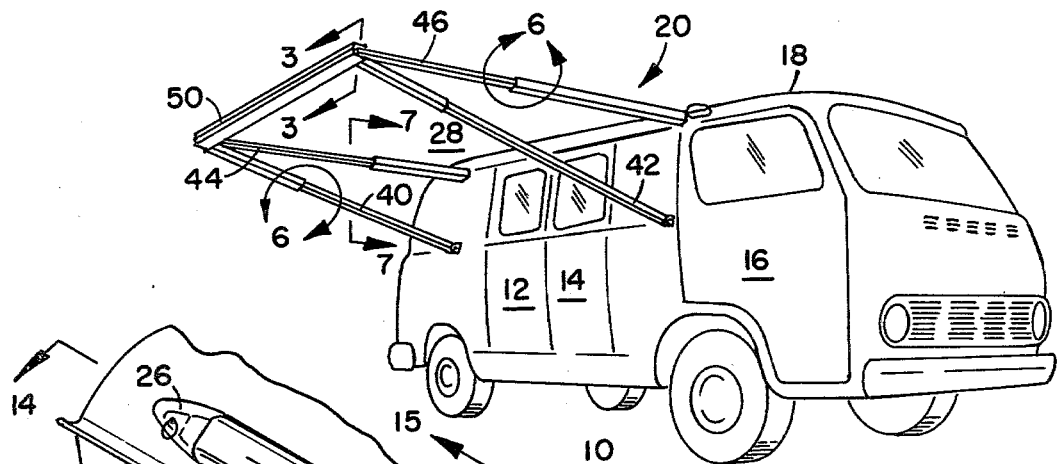
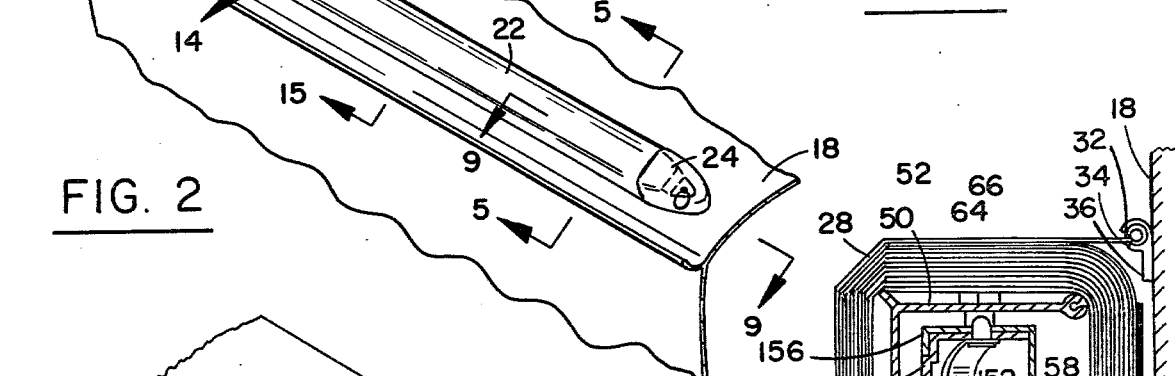
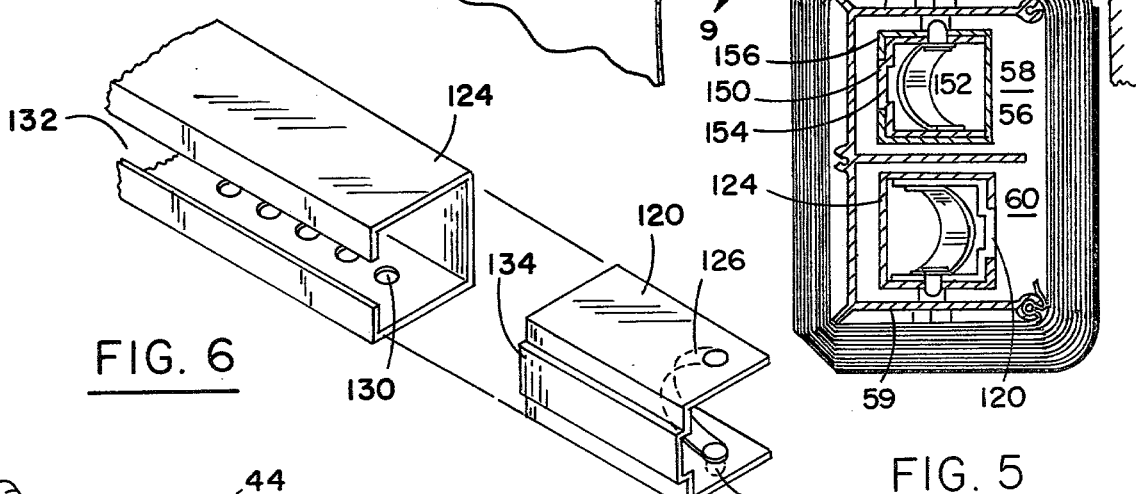
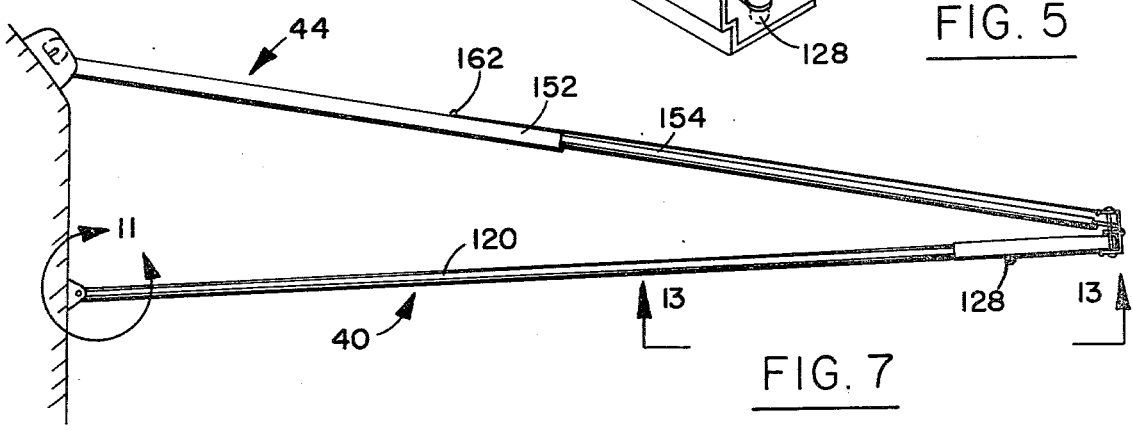

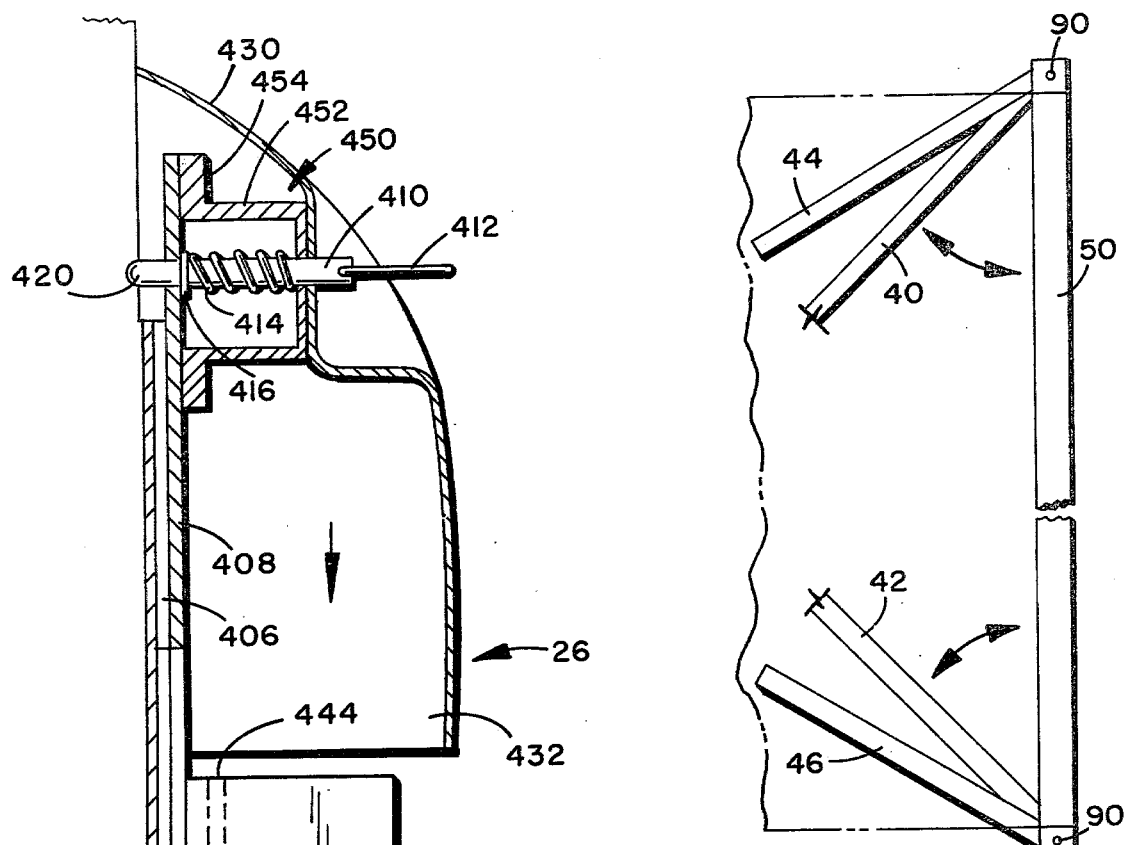
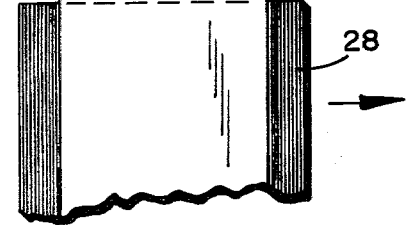
FIG. 14
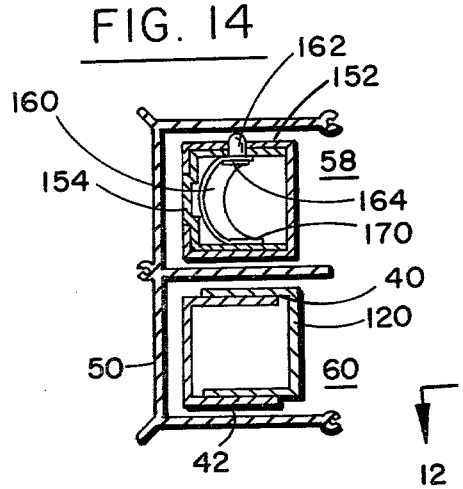
FIG. 15
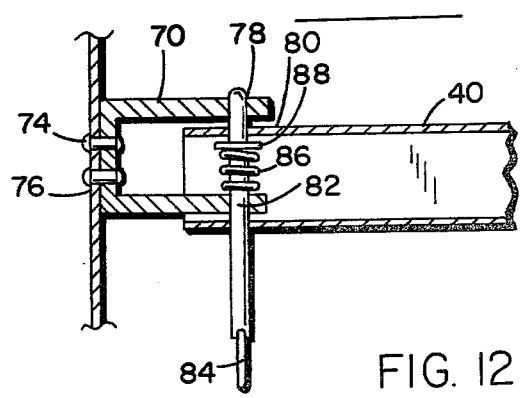
FIG. 13
FIG. 12
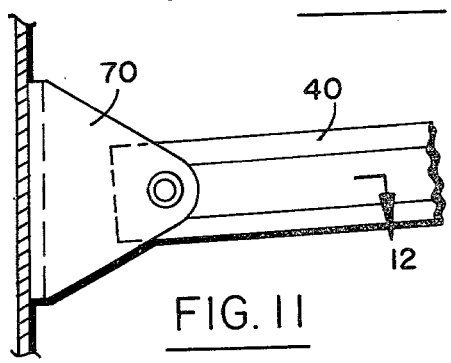
FIG. 11

RETRACTABLE AWNING

BACKGROUND OF THE INVENTION

1. Field of the Invention

The field of this invention lies within the awning art. More particularly, it lies within the vehicle awning art, wherein portable awnings are used for such vehicles as campers, trailers, vans and mobile living quarters.

2. The Prior Art

The prior art related to mobile vehicle awnings substantially resides within U.S. Pat. Nos. numbered 3,364,973 and 3,833,011. The foregoing patents generally describe an awning which is retracted and stored within a casing on the side of a vehicle. The arms are retracted into a lead bar in one instance, and in another instance, the roller is spring loaded. Both of the foregoing features, although considered an advance at the time, have been somewhat of a hindrance. In particular, the requirement is generally that a heavyweight frame must be mounted on the side of the vehicle having a casing attached thereto. This attendantly creates a complex and cumbersome attachment. As can be appreciated, the streamlined configuration of the vehicle is diminished, as well as the general overall appearance is detracted from.

The requirement of a separate casing and mounting means along with a lead bar has led the inventor to make this advance over the art.

The instant invention overcomes the prior art deficiencies by providing a substantially improved means for storing the awning. The awning itself with its lead bar comprises a storing and holding member. The awning is fundamentally wrapped around the lead bar as it is rolled backwardly toward the vehicle until it reaches the vehicle. As it is rolled in juxtaposition to the vehicle, it forms a package for the arms, attachment means, and support structure for the contracted and rolled awning. The end result is a portable awning with improved appearance, less cost and most importantly, has weight which is essential in today's vehile awning market.

The foregoing configuration is enhanced by a pair of fairings or nacelles which hold the awning in its rolled configuration. The fairings are streamlined and cover the ends of the awning in its rolled state. The ends are thus not exposed as material on a wound reel, but rather provided with a combination streamlined cover, holder, and protective member.

The entire awning in its rolled configuration helps to provide storage for the angular braces and the stabilizer bars. In addition thereto, it creates a neat and lightweight awning structure that can be stored and held on the side of a vehicle in a facile manner for easy and quick release and usage thereof.

SUMMARY OF THE INVENTION

In summation, this invention comprises a recreational vehicle awning which inherently has a self storing cover incorporated therein with support members within the lead bar thereof.

More particularly, the awning is attached to the side of a vehicle at one end and has a lead bar at the other end which receives support struts adapted for connection to the vehicle. The support struts comprise a bracing or support bar that can be adjusted inwardly and outwardly to provide an adjustable angle to the awning. In addition thereto, a strut in the form of a stabilizer bar on the upper portion holds the awning in a substantially fixed planar relationship with regard to the vehicle.

The foregoing awning in its rolled configuration with the lead bar and support members interiorly thereof forms a cover when in adjacent rolled relationship to the vehicle. The entire cover is received and held within a pair of streamlined nacelles, or fairings. The fairings can be slidably mounted or mounted by hinges to encompass and cover the two respective awning ends as it is folded into its adjacent relationship to the vehicle.

An alternative embodiment of the invention incorporates the utilization of vertical support braces that are not attached to the vehicle in their supportive relationship, but rather stand on the ground.

BRIEF DESCRIPTION OF THE DRAWINGS

The invention will be more clearly understood by reference to the description below taken in conjunction with the accompanying drawings wherein:

FIG. 1 shows a vehicle with the awning of this invention in attached relationship thereto;

FIG. 2 shows a perspective plan view looking downwardly at the awning as it is in its rolled and contracted relationship as it would be stowed on the vehicle;

FIG. 5 shows a sectional view of the awning and of the lead bar and the braces and stabilizer bars as seen through section 5—5 of FIG. 2;

FIG. 6 shows a sectional view of the joindure areas of the collapsable bars as seen encircled by Circle 6 of FIG. 1;

FIG. 7 shows a side view of the awning in the direction lines 7—7 of FIG. 1;

FIG. 11 shows a detailed view of the attachment of the awning as it is circled by Circle 11 of FIG. 7;

FIG. 12 shows a sectional view of the attachment means in the direction of lines 12—12 of FIG. 11;

FIG. 13 shows a fragmented view of the awning as it is being contracted and collapsed;

FIG. 14 shows a sectional view of the fairings as sectioned in the direction of lines 14—14 of FIG. 2; and, FIG. 15 shows the lead bar assembly as sectioned in the midline sectional area along lines 15—15 of FIG. 2.

DESCRIPTION OF THE PREFERRED EMBODIMENTS

Figure 3:
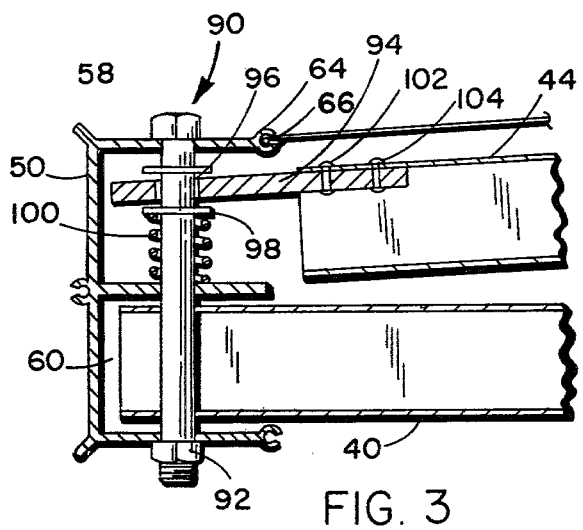
FIG. 3 shows a sectional view through lines 3—3 of FIG. 1, detailing the lead bar and structural support members that are attached thereto.

Looking at FIG. 1, a van 10 is shown. The van 10 has normal doors 12 and 14 which open up on the side, as well as a front door 16. The van has a roof 18 on which the awning 20 of this invention is supported.

Looking more particularly at FIG. 2, it can be seen that the awning in its closed position is rolled up into a member having an exposed portion 22 with two end nacelles 24 and 26 which provide a streamlined configuration in order to cover up and support the ends of the outside of the awning in its rolled condition.

The awning in its extended position comprises an awning textile material 28 that is supported at the portion near the van on the roof 18 by means of a bead 32 that is implaced within a channel 34 having a bracket or member 36 attached to the roof 18 or side of the van. The attachment is by any suitable means so that the awning material 28 can be extended therefrom and held by two braces or struts 40 and 42 that are attached to the side of the van in an extended condition and stabilized by stabilizer bars or struts 44 and 46. The stabilizer bars or struts 44 and 46 serve the function of preventing the awning 38 from moving upwardly and downwardly during gust conditions, while the braces 40 and 42 provide substantial loading support.

The foregoing braces 40 and 42 and stabilizer bars 44 and 46 fold into a lead bar assembly 50. The lead bar assembly 50 receives the respective bars and support members in their folded condition. The lead bar assembly 50 in its extended condition has an upper wall 52, a lower wall 54 and an intermediate wall 56 that divides the lead bar 50 into an upper elongated chamber 58 and a lower elongated chamber 60. The two respective chambers 58 and 60 allow for storage of the respective braces 40 and 42 and the stabilizer bars 44 and 46 therein.

The lead bar 50 is attached to the awning by means of an upper bead 64 which receives the awning in a channel 66 thereof. The awning material 28 can be provided with a tubular member or other means for insertion within the channel 66, or it can be stitched with a cord therein for insertion within the channel.

The entire lead bar 50 can be extruded or formed from a single piece of aluminum or other material, including plastic to form the assembly as seen. Regardless of how it is formed, it should be understood that the lead bar 50 is used to wrap the awning 28 therearound as well as to provide storage for the respective support arms or braces 40 and 42 and stabilizer bars 44 and 46.

The braces or support arms 40 and 42 are secured at one end to the side of the van by means of a bracket 70 that has been connected thereto by means of rivets 74 and 76 or alternatively by screws. The side of the van as seen in FIGS. 11 and 12 supports the braces by means of screw holes 74 and 76 in the bracket 70. The holes 78 and 80 in the bracket interconnect the braces 40 and 42 to the bracket by means of a spring loaded pin 82 having a ring handle 84 connected thereto that is biased by a spring 86 against a washer 88. In effect, this enables the support of the arm or braces 40 and 42 against the side of the van.

The other end of the braces 40 and 42 are attached to the lead bar 50. The connection to the lead bar 50 is by means of an enlarged bolt or rivet 90. The enlarged bolt 90 is secured by means of a bolt head at one end and a nut 92 at the other end, through the lead bar 50. The lower braces or arms 40 and 42 are secured to the bolt or rivet 90 in a manner whereby they can pivot backwardly and forwardly and swing into the lower chamber 60 when they are folded.

The bolt 90 also serves to hold the stabilizer bars 44 and 46 by virtue of the fact that an extension member 94 is secured to the bolt 90 by means of two washers 96 and 98 that are spring biased by a spring 100 holding the extension 94 in juxtaposition therebetween. The stabilizer bars 44 and 46 are held to the extension 94 by means of rivets 102 and 104 or by other suitable fastening means. As can be appreciated, any particular configuration for holding the stabilizer bars 44 and 46 to the lead bar 50 can be utilized so long as they allow a swinging pivotal movement as seen in FIG. 13 for collapsing and folding within the upper chamber 58 of the lead bar 50.

The foregoing folding assembly allows for a collapse of the respective braces and arms 40 and 42 and stabilizer bars 44 and 46.

As can be seen in the figures, the braces 40 and 42 comprise an elongated channel member 120 that slides into an enlarged channel member 124. The elongated channel member 120 has a leaf spring member 126 with a pin 128 extending therefrom through a hole that is designed for engagement within openings 130 of the enlarged channel members 124. The enlarged channel member has a longitudinal opening 132 into which a longitudinal spline or boss 134 slides. This allows for a close fitting relationship between the respective members 120 and 124 and engagement by the pin through the bias of the spring 126 into the openings 130.

The foregoing allows for slidable adjustment of the respective arms or braces 40 and 42 upwardly and downwardly so that an adjustable angular inclination of the awning 28 can be maintained at any suitable angle.

In the folded condition, the respective enlarged member 124 and extended channel member 120 are placed within the lead bar assembly 50 as can be seen in FIG. 15 by having the extending members 120 mesh within each other in a stacked relationship. In other words, as can be seen in FIG. 15, one member 120 is placed within another one. This has been shown as braces 40 and brace 42, although it must be understood that the respective elongated channel extension members 120 are the elements of braces 40 and 42 that are nested together as seen in FIG. 15.

Looking further at FIG. 15 it can be seen that the upper chamber 58 overlying the lower chamber 60 receives the stabilizer bars. The stabilizer bars 44 and 46 include a slidable inner bar 150 that mates within an outer bar 152 so that an elongated boss or channel 154 is received within a groove 156 of the outer bar 152. The outer bar 152 receiving the elongated boss 154 is provided with an inner spring clip member having an arcuate spring 160 with a button 162 extending therefrom that has been fastened by way of rivets or other securement such as welding or otherwise at point 164 thereto. The spring loading by spring 160 is effectuated by it being compressed within the bar 152.

Suffice it to say, the foregoing configuration allows for sliding engagement inwardly and outwardly of the two members 152 and 154 for sliding engagement and collapsing thereof. Fundamentally, the stabilizer bars 44 and 46 can be collapsed into end to end adjacent relationship due to their length when folded inwardly in a manner whereby they do not have to be nested as bars 120. Nevertheless, any other suitable configuration can be utilized in order to store the bars in a configuration for adjustable receipt within the lead bar 50.

In FIG. 13 it can be seen that the respective arms and bars are folding into each other. Inasmuch as the lower arms 42 and 44 fold into each other respectively, they have been shown in fragmented configuration wherein they will fold into the general nesting configuration shown in FIG. 15. However, the upper struts or stabilizer arms 44 and 46 are of shortened telescoped length whereby they can fold and collapse inwardly in the manner shown in FIG. 15.

Figure 4:
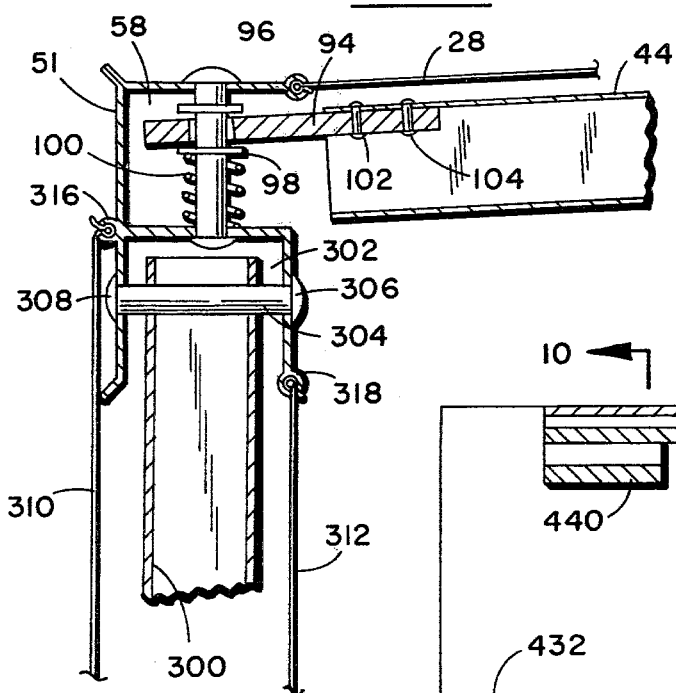
FIG. 4 shows an alternative view wherein the brace that would normally support the lead bar is shown as a vertical support member.

Looking at an alternative embodiment, it can be seen that the angular braces or arms 40 and 42 have been eliminated in the showing of FIG. 4. The braces or arms 40 and 42 are eliminated and in place thereof a vertical member 300 has been shown connected to a lower chamber, analogous to chamber 60. Lower chamber 302 has a pin 304 therethrough which receives the vertical member 300. The pin 304 received therethrough with the heads 306 and 308 allow a pivotal action of the member 300 so that it can be stored in the same manner within the chamber as the previous showings. In other words, the member 30 can be collapsed in a manner similar to the overlapping nested relationship shown in FIG. 15 or the members can be sliding members, such as that shown and reflected by the stabilizer bars 44 and 46 so that they can nest together in the manner shown in FIG. 15 and be received end to end in the chamber 302. Suffice it to say, the alternative embodiments by the upright brace member 300 can have a stake or other means to which it can be attached for driving it into the ground.

In addition thereto, a valance 310 can be utilized with a screen 312 in order to keep out insects. In order to hold the valance, a channel 316 has been shown receiving the valance 310 and a second channel 318 that receives the screen 312. Both of the channels are such that they receive a bead, such as a rope or cord that is formed by wrapping the fabric of the valance 310 or the member 312 and frictionally forcing it thereinto. The upper portion of the lead bar 51 is analogous to the upper chamber 58 shown in the remaining figures, such as FIGS. 3 and 5. As can be seen therein, the washers 96 and 98 have been shown along with the spring 100 in analogous relationship to the prior showing. Furthermore, the brace 94 is utilized with the two respective rivets 102 and 104 that hold the stabilizer bars 44 and 46 thereto.

In all of the configurations the stabilizer bar is fundamentally the same. Thus, except for the fact that a vertical bracing member 300 is substituted for the members 42 and 44, the configuration is substantially the same in all other respects.

The showings of FIGS. 7 and 16 indicated a split bar wherein one slides in the other. However, the bar can be a completed non-telescoping bar of one tubular length that nests in the manner as shown in FIG. 15, or it can be expandable as shown in FIG. 16 comprising elements 41 and 43 wherein element 41 slides into element 43. Regardless of the foregoing, it should be understood that the two respective elements can be made into one, if they are capable of being nested end to end with the lead bar 50 as can be seen within the showing of FIG. 15.

Figure 10:
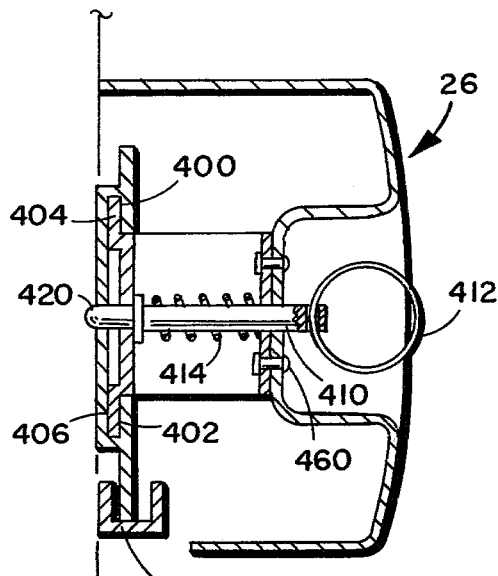
FIG. 10 shows a sectional view in the direction of lines 10—10 of FIG. 9.
Figure 9:
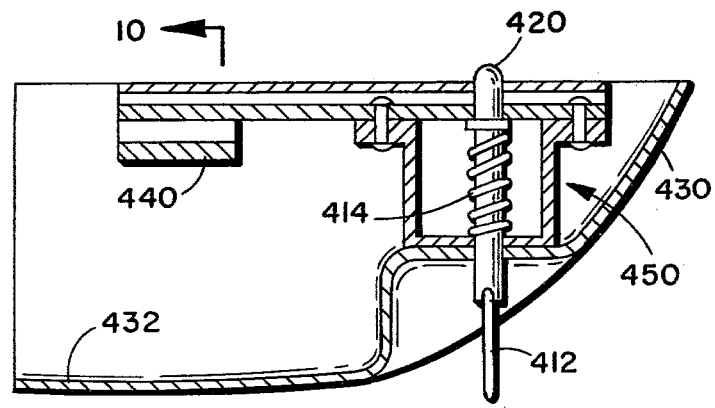
FIG. 9 shows a detailed view of the fairings as sectioned in the direction of lines 9—9 of FIG. 2.

Looking more particularly at the streamlined fairings, 24 and 26, it can be seen that in FIG. 14 a cross section thereof has been shown. The fairings 24 and 26 cover the ends of the awning material 28. The ends slide on a pair of tracks conformed by two channels 400 and 402. The two channels 400 and 402 receive a pair of U-shaped members having lower portions 404 and 406 engaging the respective tracks and an upper portion 408. The upper portion 408 has a pin 410 with a ring 412 or cap connected thereto. The pin 410 is biased by a spring 414 that is seated against a washer 416. The end of the pin 410 is a rounded end, namely pin end 420 that operates upwardly and downwardly in spring biased plunging relationship. As can be seen in FIG. 10, as well as FIG. 9, the pin end 420 is shown engaging the underlying track member upon which the fairing 26 slides.

The fairing per se is made of a formed plastic member having a streamlined end 430 that serves to provide wind deflection and an open cover or chamber portion 432 which slides over the ends of the awning 28. In this manner, the covering of the awning material 28 is accomplished so that the ends are not permitted to flutter and be displaced from their wound relationship after they are rolled as shown in FIG. 5. The channels 400 and 402 are formed within an extrusion which has upright member 440 with a lateral member 443. The foregoing serves to receive end section 444 of the lead bar 50. This allows the lead bar to rest on the ends of the fairing support channel 440 when the lead bar is in its wound and closed condition.

The spring loaded pin end 420 which engages the mounting base of the attachment means to which it is attached can be pulled upwardly for sliding the fairing back and forth on its channels in a manner whereby the fairing 26 clears the end of the lead bar 444.

It should be understood that any other suitable attachment means can be utilized, such as spring loaded clips, and other devices for the fairing. Suffice it to say, the method of attachment of the fairings 24 and 26 in their relationship to the van can be by any suitable means, such as by riveting, welding, screws, or other devices.

The pin 410 in its structural relationship is connected and held on a U-shaped member 450 comprising legs 452 and bases 454 on either end. The U-shaped bracket 450 is attached to the fairing by means of rivets 460 affixed therethrough. Here again, other suitable means for attachment can be utilized in lieu thereof.

Figure 8:
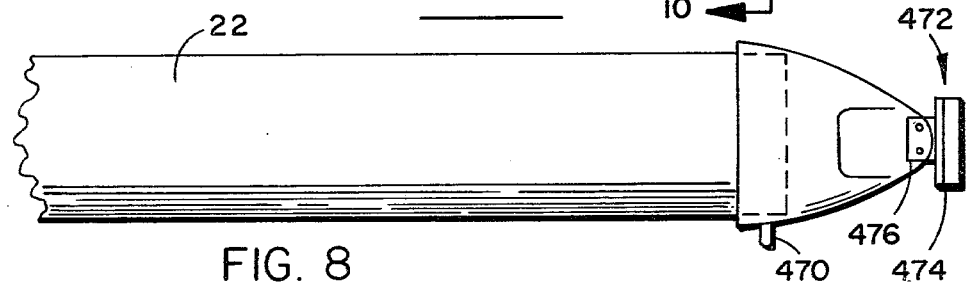
FIG. 8 shows a top plan view of an alternative embodiment of the fairings seen in FIG. 2.

As an alternative embodiment to the foregoing sliding fairings, one of which has been shown in displaced relationship in FIG. 14, a hinged fairing such as that shown in FIG. 8 can be used. The hinged fairing of FIG. 8 is similar in other respects to the other fairings except that a pin 470 is utilized to latch the fairing in an inward and outward movement. A hinge 472 having a hinge point 474 and screw members 476 are used to allow the fairing to be placed upwardly and downwardly when the pin 470 is displaced, thereby exposing the ends of the awning material 28.

The foregoing preferred embodiments of this invention can be altered so that the sliding fairing, the various members that support the awning as they are implaced in the lead bar, as well as other alternatives can be altered within the same general concept of a rolled up awning which uses a portion of its awning surface to wrap and cover the awning in cooperation with the fairings. Furthermore, members 42 and 46, and members 40 and 44 can fold into opposite channels from the ones they are shown folding into, in any suitable order so long as they can be stored therein after folding and rolling of the awning. Thus, the claims that follow hereinafter should be read broadly in light of this advance in the art.

I claim:
1. A portable vehicle awning comprising:
   an awning adapted for connection to the side of a vehicle on one edge thereof;
   a lead bar assembly at the opposing edge attached to said awning;
   a pair of channels within said lead bar comprising a first and second chamber in elongated relationship within said lead bar;

lower bracing members hingedly connected to said lead bar in one of said chambers for support of said awning and said lead bar;

stabilizer members connected to the other of said two chambers in a hinged configuration wherein said bracing members and said stabilizer members can be folded into said respective lead bar chambers and rolled with said awning into adjacent relationship to said vehicle; and, a pair of covers adapted for placement at either end of said lead bar connected to said vehicle for covering the ends of said lead bar and awning when in its rolled configuration and extending over said ends but not along the entire length of said awning when it is in its rolled configuration.

2. The awning as claimed in claim 1 further comprising:

covers for the ends of said lead bar and said awning that are in attached relationship to said vehicle on a sliding track; and, means for holding said coverings in fixed relationship along said sliding track with respect to the ends of said lead bar.

3. The awning as claimed in claim 1 wherein:

said covers are hingedly connected to said vehicle.

4. The vehicle awning as claimed in claim 2 further comprising:

a spring loaded catch having a handle attached thereto that seats within the track to which said covers are slidingly attached, so that said covers can be held in place by said pin from sliding movement.

5. The vehicle awning as claimed in claim 1 wherein:

said lower brace members are adapted for connection to the side of said vehicle on brackets attached to said vehicle.

6. The vehicle awning as claimed in claim 1 wherein:

said lower bracing members are attached to said lead bar downwardly for supporting the lead bar from the ground.

7. The vehicle awning as claimed in claim 1 wherein:

said braces comprise at least two channels engaged for movement axially with respect to each other; and, detent means for holding said channels in respective axial locations with respect to each other.

8. The vehicle awning as claimed in claim 1 further comprising:

stabilizer members attached to said lead bar and said vehicle that have been formed from two axially telescoping members; and, spring detents for holding said members in fixed axial relationship to each other.

9. The vehicle awning as claimed in claim 1 further comprising:

stabilizer bars and lower brace members each having a configuration such that they are slidably oriented with respect to each other by being each formed of channels that slide within each other; and, spring loaded detents within said channel members for holding them in fixed axial relationship to each other.

10. The vehicle awning cover as claimed in claim 9 further comprising:

channel members forming said braces which nest within each other in one of said chambers within said lead bar in nesting overlying axial relationship to each other.

11. A new and novel vehicle awning comprising:

an awning having one edge thereof adapted for attachment to a vehicle and further having a reinforced outer surface thereof in adjacent relationship to said vehicle;

a lead bar attached to the other end of said awning having a first and second chamber in elongated longitudinal channelized form;

a pair of lower brace members in opposed hinged relationship to each other having two channel portions in axial relationship to each other which mate within each other;

spring means for holding said channels in axial relationship to each other;

a pair of stabilizer bars attached to said lead bar in hinged relationship thereto comprising at least two channel members in sliding axial engaged relationship to each other and spring loaded means for holding said channel members in fixed axial relationship to each other; and, a pair of covers adapted for connection to the vehicle that can be moved away from said awning in the area it is attached to said vehicle and implaced over the ends thereof when said awning is rolled in adjacent relationship to said vehicle so that the reinforced cover of said awning when rolled up in adjacent relationship to said vehicle in combination with said covers provides a complete cover for the awning in its rolled and covered configuration.

12. The vehicle awning as claimed in claim 11 wherein:

said two covers are placed on tracks and slide in axial relationship to said awning; and, means for holding said covers in said axial relationship to said awning.

13. The vehicle awning as claimed in claim 12 wherein:

said covers are hinged for movement away from said vehicle awning when it is in its stored adjacent relationship to said vehicle; and, means for locking and holding said covers in overlying relationship to the ends of said awning.

* * * * *